(12) United States Patent
Wang

(10) Patent No.: US 7,957,421 B2
(45) Date of Patent: Jun. 7, 2011

(54) METHOD AND SYSTEM FOR MANAGING DATA SERVICE NETWORK OF METROPOLITAN AREA NETWORK

(75) Inventor: Sheng Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1096 days.

(21) Appl. No.: 11/571,519

(22) PCT Filed: Jun. 19, 2006

(86) PCT No.: PCT/CN2006/001380
§ 371 (c)(1),
(2), (4) Date: Dec. 30, 2006

(87) PCT Pub. No.: WO2006/133653
PCT Pub. Date: Dec. 21, 2006

(65) Prior Publication Data
US 2008/0013948 A1    Jan. 17, 2008

(30) Foreign Application Priority Data

Jun. 17, 2005   (CN) .......................... 2005 1 0035376

(51) Int. Cl.
*H04J 3/16* (2006.01)
(52) U.S. Cl. ...................................... 370/469
(58) Field of Classification Search .................. 370/401, 370/465, 464, 251, 469, 356
See application file for complete search history.

(56) References Cited

U.S. PATENT DOCUMENTS

| | | | |
|---|---|---|---|
| 6,044,065 A * | 3/2000 | Andersson et al. | 370/251 |
| 6,233,610 B1 * | 5/2001 | Hayball et al. | 709/223 |
| 6,977,932 B1 * | 12/2005 | Hauck | 370/392 |
| 7,586,915 B1 * | 9/2009 | Indiresan et al. | 370/392 |
| 2002/0176389 A1 | 11/2002 | Colombo et al. | |
| 2004/0098500 A1 | 5/2004 | Liu et al. | |

(Continued)

FOREIGN PATENT DOCUMENTS

CN   1499793 A   5/2004

(Continued)

OTHER PUBLICATIONS

European Search Report corresponding to European Patent Application Serial No. 06752988.3-1244, dated Dec. 30, 2008.

(Continued)

*Primary Examiner* — Dang T Ton
*Assistant Examiner* — Nourali Mansoury
(74) *Attorney, Agent, or Firm* — Conley Rose, P.C.; Grant Rodolph

(57) ABSTRACT

The present invention discloses a method and system for managing data service network of Metropolitan Area Network (MAN), as well as a method for searching data service paths based on the MAN system. The solution of the present invention includes binding Virtual Channel Trail Termination Points (VCTTPs) at each end of at least two Virtual Channels (VCs) as Path Trails with Trunk Trail Termination Points (TrunkTTPs) of a Trunk trail by Trunkbind to form a Trunk trail; and connecting the TrunkTTPs to termination points of a data service trail by Ethernet cross connection to carry data service. The present invention converges the data service with the prior Synchronous Digital Hierarchy (SDH) service smoothly, facilitates the management of data service network of MAN, increases the compatibility of network system and efficiency of service management and improves the transport efficiency and the reliability of data services of MAN.

10 Claims, 5 Drawing Sheets

U.S. PATENT DOCUMENTS

2006/0239284 A1* 10/2006 Kumar et al. .................. 370/401
2007/0008958 A1*  1/2007 Clemm et al. ................. 370/352

FOREIGN PATENT DOCUMENTS

| CN | 1622555 A | 6/2005 |
|---|---|---|
| EP | 0700230 | 3/1996 |
| EP | 0884875 A2 | 12/1998 |
| JP | 2001285367 A | 10/2001 |
| WO | WO 2004/008710 | 1/2004 |

OTHER PUBLICATIONS

Hong et al., "An intetegrated network management framework for internet access service using ATM over ADSL technology." High Speed Networks and Multimedia Communications 5th IEEE International Conference, Jul. 3-5, 2002.

Graber et al., "Multiservice switches and the service intelligent optical architecture for SONET/SDH metro networks." Bell Labs Technical Journal, vol. 8, No. 2, Sep. 17, 2003.

Kimura et al., "A Study on a Management Interface for VP Protection Switching." Proceedings of the 7th International Conference on Computer Communications and Networks, Oct. 12-15, 1998.

Foreign communication from a counterpart application, Chinese application 200680013326.1, Office Action dated Aug. 18, 2009; 7 pages.

Foreign communication from a counterpart application, Chinese application 200680013326.1, Partial English Translation Office Action dated Aug. 18, 2009; 7 pages.

Foreign communication from a counterpart application, European application 06752988.3, Summons for Oral Proceedings dated Nov. 30, 2010, 10 pages.

Foreign communication from a counterpart application, PCT application PCT/CN2006/001380, Written Opinion dated Oct. 26, 2006, 3 pages.

Foreign communication from a counterpart application, PCT application PCT/CN2006/001380, International Search Report dated Oct. 26, 2006, 4 pages.

Huang Weiqiang, "The Realization of Trunk Technology in Local Area Network," Journal of Jiaozuo University, No. 2, Apr. 2003.

* cited by examiner

METHOD AND SYSTEM FOR MANAGING DATA SERVICE NETWORK OF METROPOLITAN AREA NETWORK

FIELD OF THE INVENTION

The present invention relates to Metropolitan Area Network (MAN) management techniques, and more particularly, to a method and system for managing data service network of MAN, as well as a method for searching data service paths based on the system.

BACKGROUND

As the Optical Transport Network (OTN) gradually changes from a backbone network to the core operating network providing integrated services, the MAN as "nerve ends" of the large backbone optical networks is improved so as to provide comprehensive network services for users.

The MAN is a network that covers a city and its suburbs for providing an integrated transporting platform for metropolitan multiple services, which is generally applied in large or medium-sized cities. The MAN carries out access of voice, data, video, multimedia, Internet Protocol (IP) and the like, in basis of the multi-service optical transport network. Typically, it fulfills comprehensive protocol interworking between enterprises or individual consumers in the access network and operators in the backbone network. And, it is an integrated solution with the wide-band optical transport network as an open platform for providing multi-service transport for metropolitan applications.

The network management system of MAN requires a mature function for managing network element and network, and imposes a higher demand on carrying out large-scale, fast intelligent and end-to-end circuit configuration and realizable unified multi-service configuration and management aiming at the characteristic of large scale and multiple service types of MAN. Further, it is required to provide a management interface for an up layer network management system so that the network management system of MAN can be admitted to the integrated transport network management platform for providing a complete service support solution for co-managing large-scale network.

Presently, the MAN is principally serving as a Multi-Service Transfer Platform (MSTP) based on the Synchronous Digital Hierarchy (SDH) of optical networks, which fully utilizes the mature SDH technology and has been recognized for its abilities of performance monitor, protection switching and network management. The MAN can be reconstructed to form a Multi-Service Transport Platform primarily by mapping the multiple services into various SDH time slots in the manner of Virtual Channel (VC) concatenation or the like, and by physically integrating the SDH devices and the packet switch devices of layer 2, layer 3, or even layer 4 into a single entity.

The SDH-based MSTP has the following features that it can provide multiple physical interfaces when guaranteeing compatibility with services based on the traditional SDH network, thereby greatly reducing the cost of updating the prior SDH devices; further, it realizes to transport multiple data services with high efficiency and flexibility, because the MSTP system employs a simplified network architecture and separates the interfaces with the protocols; and it can maintain the advantages of SDH and incorporate the functions of the traditional SDH network, to effectively manage the bandwidth, thereby reducing the operation cost.

Since the service subject faced by the MAN changes from the traditional Time Division Multiplexing (TDM) voice service to various broadband services and meanwhile the client signals faced by the MAN change, since many customers request to construct a Virtual Local Area Network (VLAN) or Virtual Private Network (VPN) on layer 2 to realize resource share by various nodes of enterprises, it is required to support the data services such as Ethernet Private Line (EPL), Ethernet Virtual Private Line (EVPL) or the like. At the same time, the interface types become more and more, such as Fast Ethernet (FE), Gigabit Ethernet (GE) and Enterprise System Connection (ESCON).

Since the traditional MAN management system can merely manage the SDH services, it is highly required for the network management to support the data service management due to the change of the service subject of the MAN, so as to conveniently provide data services in the MAN and to facilitate a complete compatibility of voice service and data service within the system.

Therefore, the prior MAN management method directs to the SDH service only and the service model simply includes an SDH VC model that is formed by a path trail and trail termination points at two ends, while there is no model for other data services. As a result, it cannot carry out the network management for data services.

SUMMARY OF THE INVENTION

The present invention provides a method for managing data service network of MAN. The method includes steps of:
binding VCTTPs at each end of at least two VCs as Path Trails with TrunkTTPs of a Trunk trail by Trunkbind;
connecting the TrunkTTPs to termination points of a data service trail by Ethernet cross connection.

In another aspect, the present invention provides a MAN system for managing data service network. The MAN system includes:
a data service trail, formed by one or more Trunk trails connected in series, wherein TrunkTTPs at two ends of the one or more Trunk trails are connected with termination points of the data service trail, and
each Trunk trail is formed by binding at least two VCs.

Based on the above method and system, the present invention provides a method for searching data service trail, applicable to the MAN system. The method includes steps of:
from a local Ethernet cross, searching for a local MACTTP and a local TrunkTTP connected with the Ethernet cross;
searching for a corresponding Trunk trail from the local TrunkTTP;
searching for a peer TrunkTTP from the Trunk trail;
searching for a peer Ethernet cross and a peer MACTTP from the peer TrnnkTTP.

It can be seen from the above description that the present solution carries out the transition from the traditional SDH service to the data service such as EPL/EVPL by building a Trunk trail matched with the data service, and enables the Trunk trail to carry the data service and the MAC layer port by Ethernet cross connection. Thereby, it converges the data service with the prior SDH service smoothly, facilitates the management of data service network of MAN, increases the compatibility of network system and efficiency of service management and improves the transport efficiency and the reliability of data services of MAN.

DETAILED DESCRIPTION OF THE INVENTION

The preferred embodiments of the present invention will be described in detail with reference to the drawings.

To converge the data service with the SDH service, the embodiment of the present invention provides Trunks as transition from the data service to the SDH service, wherein one Trunk trail includes at least two bound SDH VC trails of the same capacity and speed. Herein, the Trunks employ virtual concatenation. The bound VC trails can be called as Path Trail in the present invention. The VC rate level includes VC12, VC3, VC4 etc. Preferably, the bound VC trails in the embodiment should be in the same rate level, but it does not exclude those bound in different rate levels. The Path Trail includes a Connection and VC Trail Termination Points (VCTTP) at two ends. In the embodiment, the Path Trail is substantially the same with a general VC trail, except that the source and the destination of the link formed by the VC trail generally terminate at a general SDH board, whereas the source and the destination of the link formed by one or more Path Trails of the embodiment terminate at a board which has a data service feature and where the data service reaches. Trunk Trail Termination Points (TrunkTTP) locate at two ends of the Trunk trails.

The embodiment binds the VCTTPs at two ends of the VC that serves as the Path Trail with the TrunkTTPs of the Trunk trail by Trunkbind respectively and then connects the TrunkTTPs to termination points of the data service trail by Ethernet cross connection.

Figure 1:
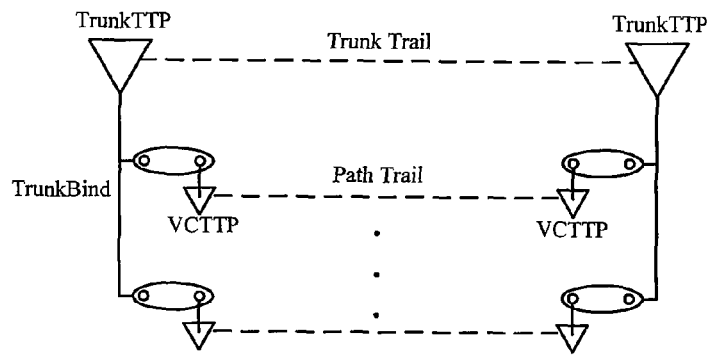
FIG. 1 is a schematic diagram showing architecture of a Trunk trail according to an embodiment of the present invention.

The Trunk trail is established, as shown in FIG. 1, by binding the VCTTPs at each end of at least two Path Trails in the same rate level with the corresponding TrunkTTPs by Trunkbind. Since the Trunkbind is unidirectional, it requires two Trunkbinds in opposite directions to realize the bidirectional function. Generally, the actual data service transport requests to establish a Trunk trail, for example, one may select the rate level, quantity, and direction etc. of the bound Path Trail according to the rate, bandwidth and transport direction of the data service. After completing the Trunkbind, the properties of the Trunkbind may be saved, including network element identifier, shelf identifier, board position, Trunk port number, concatenation manner, bound trail level, direction, and bound trail ID list, wherein the network element identifier, shelf identifier, board position, and Trunk port number represent the position of the Trunk trail; the bound trail level refers to a rate level of the bound Path Trail; the direction refers to a direction of the Trunk trail, i.e. of the bound Path Trail; and the bound trail ID list lists all the trail IDs of the bound Path Trails in the Trunk trail.

Figure 2:
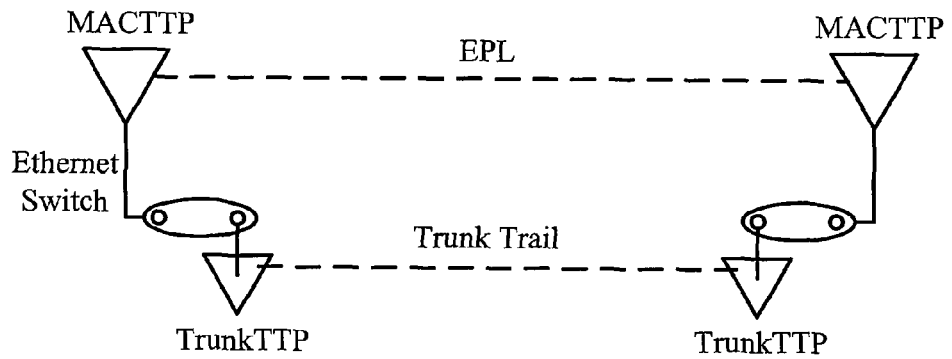
FIG. 2 is a schematic diagram showing architecture of an EPL trail according to an embodiment of the present invention.

Based on the established Trunk trail, the end-to-end network management for an EPL service is depicted in FIG. 2.

The data service trail of EPL/EVPL locates at the second layer of the network, i.e. the Media Access Control (MAC) layer. Two ends of the data service trail are MAC Trail Termination Points (MACTTP). The TrunkTTPs at two ends of the Trunk trail are connected to the MACTTPs at two ends of the EPL by Ethernet cross, and thereby the data service of EPL can be carried by the Trunk trail. The service interaction between the MAC port and the Trunk port is carried out by Ethernet cross connection, that is, it transports the service data from the MACTTP to the TrunkTTP so as to enter the Trunk trail and transports the service data from the TrunkTTP to the MACTTP so as to enter the EPL data service trail.

It can be seen that the Trunk trail is a bridge between the SDH service and the data service, the service layer of the Trunk trail is the Path Trail and the customer layer of the Trunk trail is the data service link. Further, the EPL service layer includes only one Trunk trail.

Figure 3:
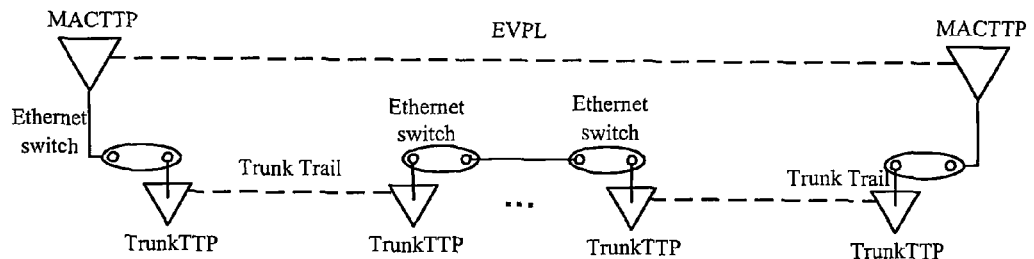
FIG. 3 is a schematic diagram showing architecture of an EVPL trail according to an embodiment of the present invention.

The end-to-end network management for the EVPL service is depicted in FIG. 3. It connects the head TrunkTTP of a Trunk trail to the end TrunkTTP of a Trunk trail in turn and the resulting link has the source and the destination terminated at a board which has a data service feature. And then the TrunkTTPs of the source and the destination are connected to the MACTTPs at two ends of EVPL by Ethernet cross, thereby the Trunk trails can carry the EVPL data service.

It can be seen that the service layer of the EVPL is formed by connecting multiple Trunk trails, or in some case is only a single Trunk trail.

Figure 4:
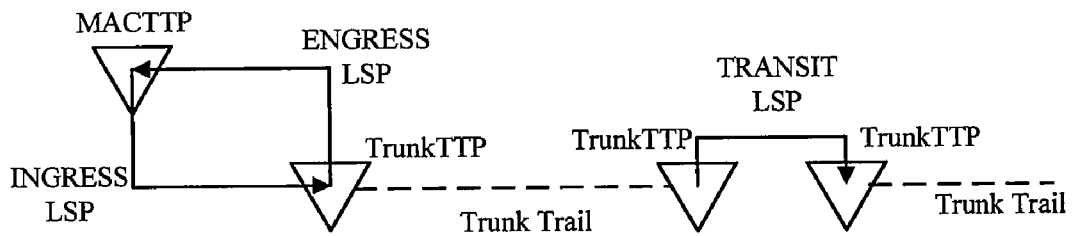
FIG. 4 is a schematic diagram showing architecture of an Ethernet cross according to an embodiment of the present invention.

In the above implementations, there are three types of Ethernet cross, including Ingress Label Switched Path (INGRESSLSP), Engress Labeled Switch Path (ENGRESSLSP), and Transit Labeled Switch Path (TRANSITLSP). The relations between the each type of Ethernet cross and the MACTTP/TrunkTTP are depicted in FIG. 4. In particular, the INGRESSLSP is used to connect MACTTP to TrunkTTP for carrying services in a direction from MACTTP to TrunkTTP; the ENGRESSLSP is used to connect MACTTP to TrunkTTP for carrying services in a direction from TrunkTTP to MACTTP; and the TRANSITLSP is used to connect TrunkTTPs for carrying services between TrunkTTPs.

Actually, all the nodes of the network can be divided into internal nodes and edge nodes, wherein each node has a corresponding TrunkTTP. The edge node comes in and goes out of the network through the connection between TrunkTTPs and MACTTPs realized by INGRESSLSP and ENGRESSLSP. And the internal nodes are connected with each other through the connection between TrunkTTPs and TrunkTTPs realized by TRANSITLSP.

After completing the Ethernet cross connection, the board in charge of Ethernet cross will store the properties of the Ethernet cross, including network element identifier, shelf identifier, type, source service board identifier, source service port identifier, source service type, source service Virtual Local Area Network (VLAN) identifier (VLAN ID), source service tunnel, source service VC, destination service board identifier, destination service port identifier, destination service type, destination service VLAN ID, destination service tunnel, destination service VC, service level, administration status, and service direction, etc.

Figure 5:
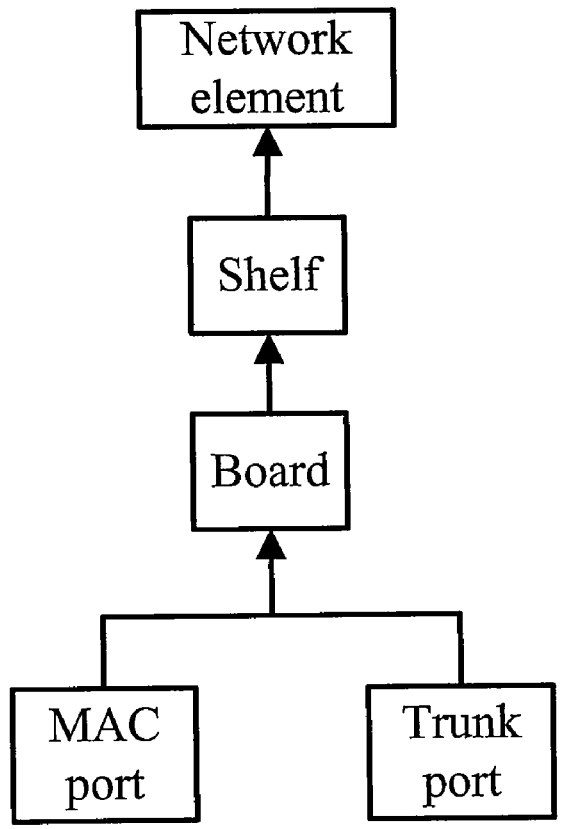
FIG. 5 is a schematic diagram showing a network management model for devices according to an embodiment of the present invention.

For the network administrator to describe the devices more conveniently, a network management model for devices according to the method in an embodiment of the present invention depicted in FIG. 5 includes a network element (NE), a shelf, a board, and a port, wherein the NE includes multiple shelves, the shelf includes multiple boards, the board includes multiple ports, and the port includes the MAC port or the Trunk port or both, which correspond to the MACTTP and the TrunkTTP respectively.

The above model for devices adds a MAC port and a Trunk port objects in basis of the traditional SDH. The MAC port has the properties including operating mode, enabling state, flow control attribute, maximum packet length, Tag attribute, Ingress detection function, default VLAN, default VLAN priority, and encapsulation format. The Trunk port has the properties including enabling state, maximum packet length, Tag attribute, Ingress detection function, default VLAN, default VLAN priority, encapsulation format and encapsulation protocol.

For the network management system to search for data services on devices according the embodiment, a method for service search is provided, which includes the following processes: searching Path Trail; searching Trunk trail; and searching data service trail. The process of searching Path Trail is similar to the traditional service searching process of VC trail in the SDH network management system of MAN.

Figure 6:
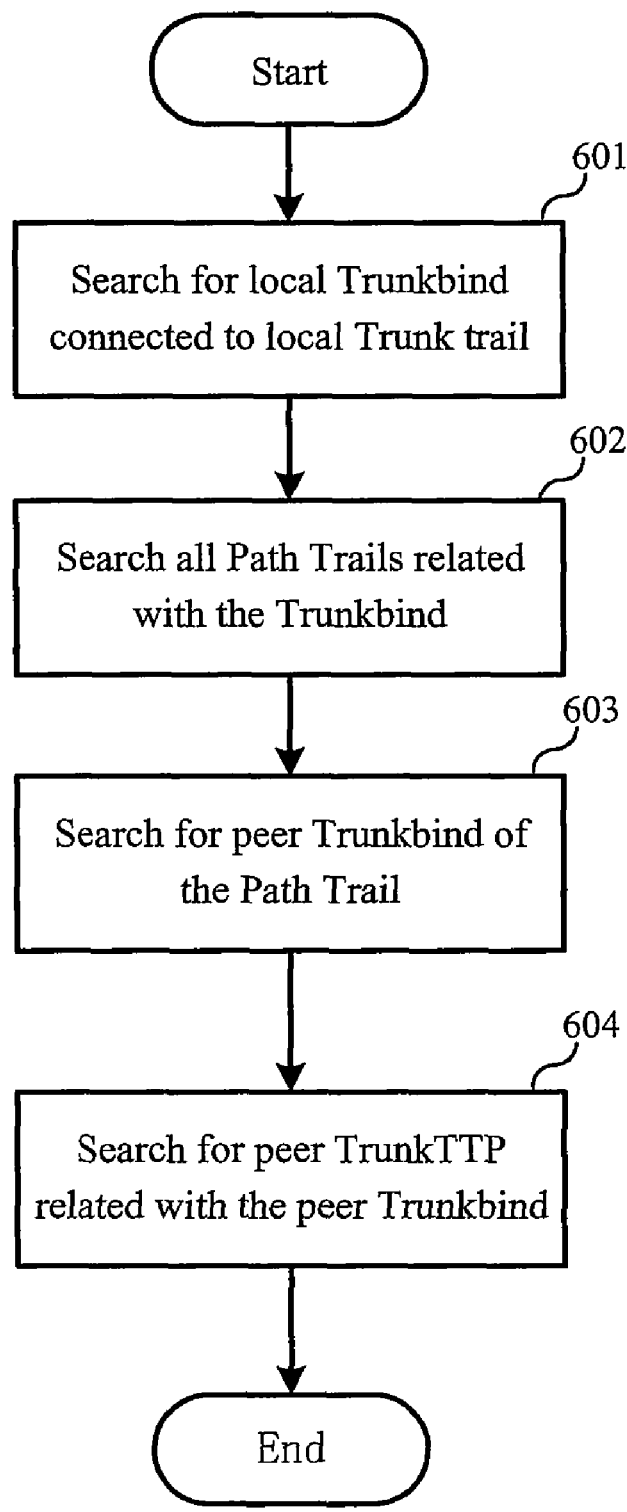
FIG. 6 is a flow chart showing a search process for a Trunk trail according to an embodiment of the present invention.

Referring to FIG. 6, the process of searching Trunk trail includes the following detailed steps.

At step 601, starting from a local TrunkTTP, search for a respective local Trunkbind connected with the TrunkTTP.

The network management starts the searching process from a TrunkTTP object, and inquires the Trunkbind connected with the TrunkTTP first.

At step 602, search all Path Trails related to the local Trunkbind.

First, acquire the VCTTP from the properties of the Trunkbind, and search for the corresponding Path Trail for each acquired VCTTP successively. Each VCTTP is searched until all the Path Trails are obtained.

At step 603, search for a corresponding peer Trunkbind of each found Path Trail.

Particularly, it should first search for a peer VCTTP according to the found Path Trail, and then acquire a corresponding Trunkbind for the peer VCTTP. It should be noted that the above Trunkbind has an opposite direction from the local Trunkbind in step 601, that is, if the local Trunkbind has an uplink direction, the peer Trunkbind will have a downlink direction, and vice versa. If a peer VCTTP or a peer Trunkbind is not found, continue to search for a next local VCTTP and perform step 603 repeatedly until all the local VCTTPs are obtained.

At step 604, search for a corresponding peer TrunkTTP of the peer Trunkbind. When the peer TrunkTTP is found, a Path Trail may be obtained. Other Path Trails can be obtained in the same way by performing the above steps. And when all the Path Trails are obtained, the whole Trunk trail is acquired.

Similar to step 603, if the search for the peer TrunkTTP fails, continue to search for a next local VCTTP and perform steps 603 and 604 repeatedly until all the local VCTTPs are obtained.

Here, the searches for the uplink Trunkbind and the downlink Trunkbind may be separate. For example, search for the uplink Trunkbind first, and the peer will be in a downlink direction, and thus a Trunk may be obtained in single direction. And then, search for the downlink Trunkbind, and the peer will be in an uplink direction. As a result, a bidirectional Trunk trail is obtained.

Figure 7:
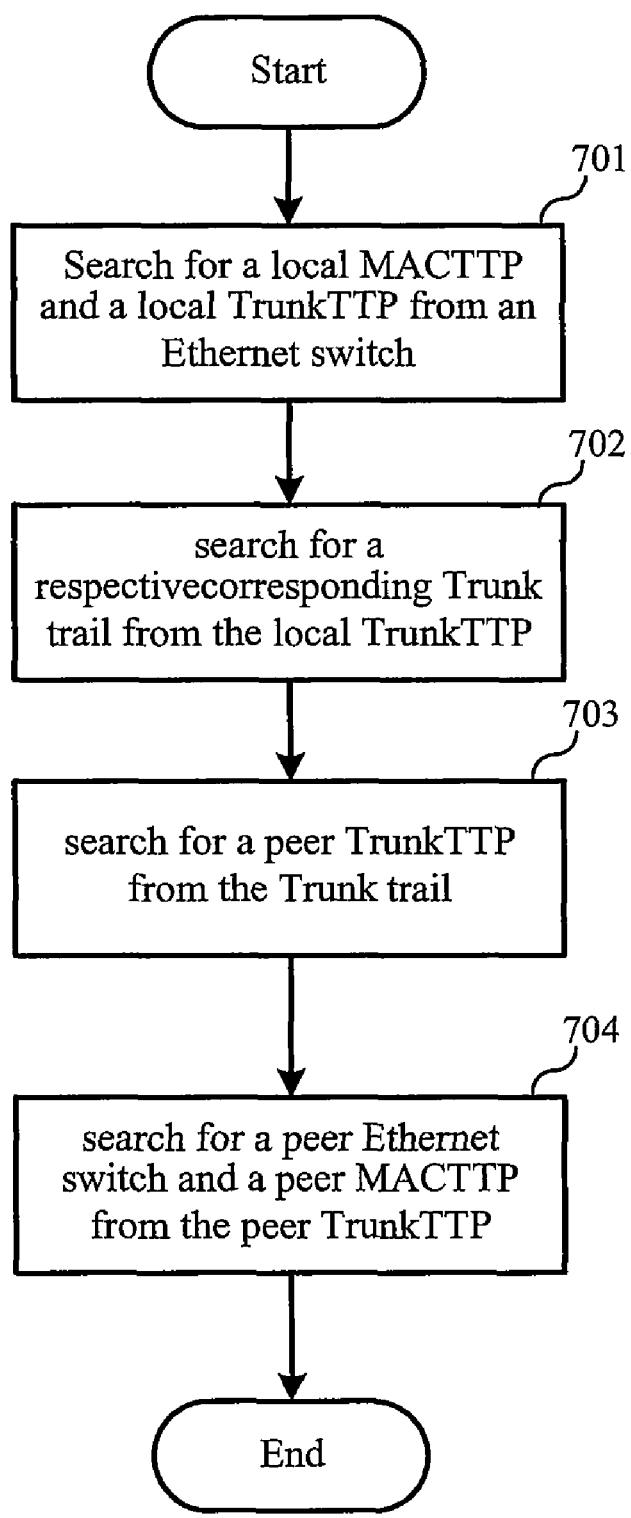
FIG. 7 is a flow chart showing a search process for an EPL trail according to an embodiment of the present invention.

Referring to FIG. 7, the searching process of EPL trail includes the following steps.

At step 701, starting from an Ethernet cross, search for a local MACTTP and a local TrunkTTP connected with the Ethernet cross.

The network management system starts the searching process from a local Ethernet cross. The Ethernet cross can be either an INGRESS or an ENGRESS, and the difference is that they have different directions. For a bidirectional EPL, the searching process should be carried out in the two directions.

At step 702, search for a corresponding Trunk trail from the local TrunkTTP.

Here, the searching process of TrunkTTP can be carried out in accordance with the flow in FIG. 6. If a relating Trunk trail for the TrunkTTP cannot be found, the searching will fail.

At step 703, search for a peer TrunkTTP from the Trunk trail.

Since the EPL can be carried by only one Trunk trail, the peer TrunkTTP of the Trunk trail will be the termination.

At step 704, search for a peer Ethernet cross and a peer MACTTP from the peer TrunkTTP.

Based on the peer TrunkTTP, search for a corresponding Ethernet cross, which has an opposite direction from that in step 701. If the local Ethernet cross is an INGRESSLSP, the peer will be an ENGRESSLSP, and vice versa. After finding the MACTTP, it will obtain a unidirectional EPL. And then, search for another unidirectional EPL in the opposite direction, and if the EPL is found, a bidirectional EPL can be obtained by combining the two unidirectional EPLs.

Figure 8:
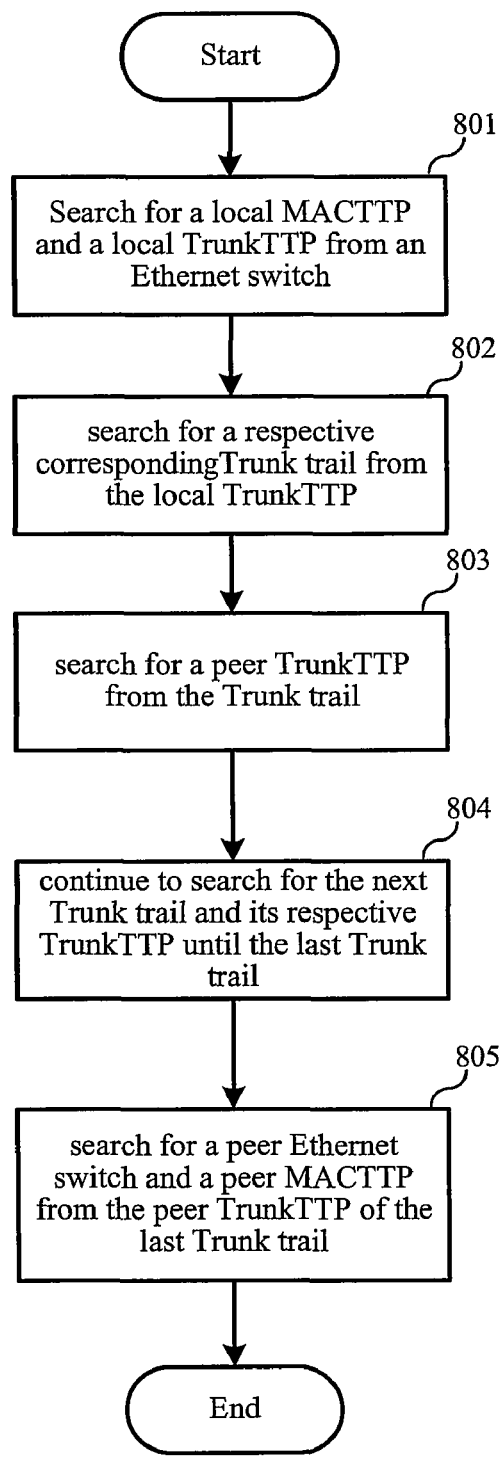
FIG. 8 is a flow chart showing a search process for an EVPL trail according to an embodiment of the present invention.

Referring to FIG. 8, the searching process of EVPL trail is similar to that of EPL trail, except that the EVPL trail may be formed by connecting multiple Trunk trails, which thereby requires searching from the first Trunk trail to the last one.

At step 801, starting from a local Ethernet cross, search for a local MACTTP and a local TrunkTTP connected with the Ethernet cross, this step is similar to step 701.

At step 802, search for a corresponding Trunk trail from the local TrunkTTP, which will be the first Trunk trail from the local network.

At step 803, search for a peer TrunkTTP from the Trunk trail to obtain a TrunkTTP in the other end of the first Trunk trail. Then, determine whether the TrunkTTP is the last one, and if so, proceed to step 805; otherwise, obtain a related TRANSITLSP and proceed to step 804.

At step 804, regarding the peer TrunkTTP found in step 803 as an original TrunkTTP of a next Trunk trail, continue to search for the next Trunk trail and its TrunkTTP until the last Trunk trail.

At step 805, search for a peer Ethernet cross and a peer MACTTP from the peer TrunkTTP of the last Trunk trail.

Similarly, after obtaining a unidirectional EVPL, search for another unidirectional EVPL in the opposite direction, and if the EVPL is found, combine the two unidirectional EVPLs to obtain a bidirectional EVPL.

Although illustrative embodiments have been described herein with reference to the accompanying drawings, it is to be understood by those skilled in the art that the present invention is not limited to those preferred embodiments, and that various changes and modifications can be made therein without departing from the spirit and the scope of the invention. Thus, it is intended that the present invention covers the modifications and variations of this invention provided they come within the scope of the appended claims and their equivalents.

The invention claimed is:

1. A method for managing a data service network of a Metropolitan Area Network (MAN), comprising:

A. binding Virtual Channel Trail Termination Points (VCTTPs) at each end of at least two Virtual Channels (VCs) as Path Trails with Trunk Trail Termination Points (TrunkTTPs) of a Trunk trail by a Trunkbind; and B. connecting the TrunkTTPs to termination points of a data service trail by an Ethernet cross connection, wherein when the data service trail is an Ethernet Private Line (EPL), Step B comprises connecting the TrunkTTPs at two ends of the Trunk trail to Media Access Control Trail Termination Points (MACTTPs) of the EPL by the Ethernet cross connection, respectively, and wherein when the data service trail is an Ethernet Virtual Private Line (EVPL), step B comprises:

connecting the TrunkTTPs of at least two Trunk trails to make the Trunk trails form a Trunk trail link; and connecting the TrunkTTPs at two ends of the Trunk trail link to MACTTPs of the EVPL by the Ethernet cross connection, respectively.

2. The method according to claim 1, wherein the Ethernet cross connection comprises:

an Ingress. Label Switched Path, for connecting the termination points of the data service trail to the TrunkTTPs;

an Egress Labeled Switch Path, for connecting the TrunkTTPs to the termination points of the data service trail; and a Transit Labeled Switch Path, for connecting the TrunkTTPs.

3. The method according to claim 1, wherein the VCs in the step A are at a same rate level.

4. The method according to claim 1, wherein the step A further comprises selecting a bound VC trail according to transport requirements of the data service.

5. The method according to claim 1, wherein the step A further comprises saving properties of the Trunkbind after completion of the binding, wherein the properties of the Trunkbind comprise a network element identifier, a shelf identifier, a board position, a Trunk port number, a concatenation manner, a bound trail level, direction, and a bound trail ID list; and wherein the step B further comprises saving properties of the Ethernet cross connection after completing the Ethernet cross connection, wherein the properties of the Ethernet cross connection comprise a network element identifier, a shelf identifier and type, a source service board identifier, a source service port identifier, a source service type, a source service Virtual Local Area Network (VLAN) identifier (VLAN ID), a source service tunnel, a. source service VC, a destination service board identifier, a destination service port identifier, a destination service type, a destination service VLAN ID, a destination service tunnel, a destination service VC, a service level, an administration status, and a service direction.

6. A Metropolitan Area Network (MAN) system for managing a data service network, comprising:

a data service trail, formed by one or more Trunk trails connected in series, wherein Trunk Trail Termination Points (TrunkTTPs) at two ends of the Trunk trails are connected with termination points of the data service trail, wherein each Trunk trail is formed by binding at least two Virtual Channels (VCs), and wherein the data service trail is an Ethernet Private Line (EPL) or Ethernet Virtual Private Line (EVPL), wherein the termination points of the data service trail are located at ports of the data service trail of MAN devices and the TrunkTTPs are located at Trunk ports of the MAN devices, wherein the MAN devices comprise a network element, a shelf, a board, and a port, and wherein the network element (NE) comprises multiple shelves, a shelf comprises multiple boards, a board comprises multiple ports, and a port comprises a MAC port, a Trunk port, or both.

7. The system according to claim 6, wherein the binding at least two VCs comprises connecting Virtual Channel Trail Termination Points (VCTTPs) at two ends of each VC with the TrunkTTPs at two ends of the Trunk trails by a Trunkbind, respectively; wherein the TrunkTTPs at two ends of the Trunk trails are connected with the termination points of the data service trail by an Ethernet cross connection; and wherein the Trunk trails in series are connected by the Ethernet cross connection.

8. A method for searching a data service trail, applicable to a Metropolitan Area Network (MAN) system for managing a data service network, the MAN comprising: the data service trail, formed by one or more Trunk trails connected in series, wherein Trunk Trail Termination Points (TrunkTTPs) at two ends of the Trunk trails are connected with termination points of the data service trail, and wherein each Trunk trail is formed by binding at least two Virtual Channels (VCs), the method comprising:

a. from a local Ethernet cross connection, searching for a local Media Access Control Trail Termination Point (MACTTP) and a local TrunkTTP connected with the Ethernet cross connection;

b. searching for a corresponding Trunk trail from the local TrunkTTP;

c. searching for a peer TrunkTTP from the Trunk trail; and d. searching for a peer Ethernet cross connection and a peer MACTTP from the peer TrunkTTP, wherein the data service trail is an Ethernet Private Line (EPL) or Ethernet Virtual Private Line (EVPL).

9. The method according to claim 8, wherein the step b further comprises:

b1. from the local TrunkTTP, searching for a local Trunkbind connected with the local TrunkTTP;

b2. from the local Trunkbind, searching for all VCs contained in the Trunkbind;

b3. searching for a peer Trunkbind for each VC; and b4. searching for the peer TrunkTTP contained in each peer Trunkbind.

10. The method according to. claim 9, wherein after the step b4, the method further comprises: determining whether the peer TrunkTTP is a last TrunkTTP, and if not, regarding the peer TrunkTTP as an original TrunkTTP of a next Trunk trail, continuing to search the next Trunk trail; otherwise, proceeding to the step c.

* * * * *

UNITED STATES PATENT AND TRADEMARK OFFICE
CERTIFICATE OF CORRECTION

PATENT NO. : 7,957,421 B2  Page 1 of 1
APPLICATION NO. : 11/571519
DATED : June 7, 2011
INVENTOR(S) : Sheng Wang It is certified that error appears in the above-identified patent and that said Letters Patent is hereby corrected as shown below:

Column 7, line 25 (claim 2, line 3) after "Ingress" and before "Label", delete the ".".

Signed and Sealed this
Nineteenth Day of July, 2011

David J. Kappos
*Director of the United States Patent and Trademark Office*